Aug. 21, 1951 J. J. WACHTER ET AL 2,565,152
PROCESS OF IMPREGNATING A FIBROUS
SHEET WITH A PHENOLIC RESIN
Filed Oct. 30, 1946
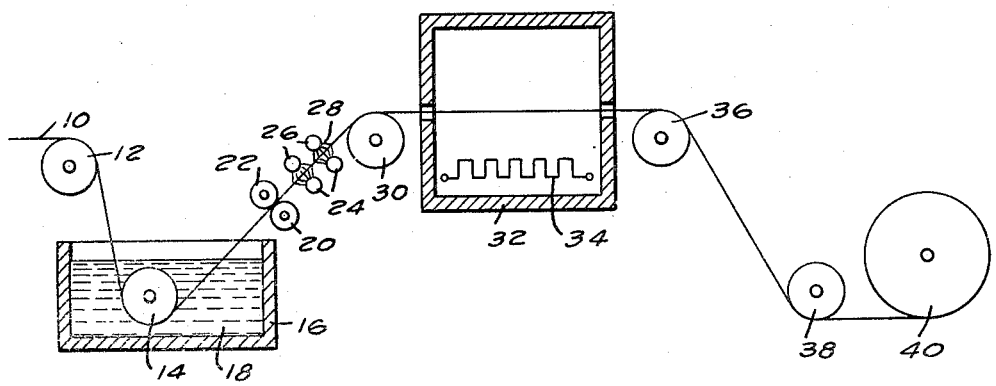
WITNESSES:
INVENTORS
Joseph J. Wachter and
Cyril J. Straka.
BY
Frederick Shapoe
ATTORNEY Patented Aug. 21, 1951

2,565,152

UNITED STATES PATENT OFFICE 2,565,152

PROCESS OF IMPREGNATING A FIBROUS SHEET WITH A PHENOLIC RESIN

Joseph J. Wachter, East Pittsburgh, and Cyril J. Straka, Wilkinsburg, Pa., assignors to Westinghouse Electric Corporation, East Pittsburgh, Pa., a corporation of Pennsylvania Application October 30, 1946, Serial No. 706,582

5 Claims. (Cl. 117—65)

1

This invention relates to a process for treating fibrous materials with phenolic resins for producing laminate therefrom.

A common method of combining fibrous materials with resins is to apply a coating of a solution of the resin commonly called a varnish to a sheet of fibrous material, such as paper or cloth, and the varnish coated sheet is then passed through an oven in order to evaporate the solvent leaving only the resin upon the sheet material. A number of plies of the resin coated sheet material are then superimposed and consolidated under heat and pressure into a unitary laminated member. When phenol-aldehyde resins or other resins having an intermediate polymeric or B stage are so applied to the sheet material, the oven functions to polymerize the resin from a low polymer or A stage in the solution to such intermediate stage on the sheet material. It is well known to the skilled worker in the art that the times and temperatures required for converting the phenolic resin to the intermediate stage are somewhat critical and the time cannot be shortened or the temperature changed substantially without impairment of the properties resin for its intended function. Therefore, according to present practice a given oven can be used to treat only a given amount of sheet material in a given time. The conversion from the A stage to the B stage is designated as "gelation" of a varnish.

It is desirable for purposes of economy, to meet brief demands for excess quantities of treated fibrous sheet material, and for other purposes, that sheet material carrying a coating of phenolaldehyde resin in solution thereon be processed in a reduced period of time to a suitable intermediate or B stage resin. Such expedited treatment, however, should not result in excessive loss of resin or in inferior quality of final laminated product.

The object of this invention is to provide for a rapid conversion of phenolic resins applied to fibrous material from the A stage to the B stage.

A further object of this invention is to provide for applying steam to fibrous sheet material coated with a thermosetting phenol-aldehyde resin varnish to expedite curing and to improve the properties of the ultimate laminated product.

A still further object of the invention is to provide for expediting the process of preparing laminates from sheet material and phenol-aldehyde resin varnish in order that conversion of the phenol-aldehyde resin to the B stage and to the final infusible stage is greatly expedited.

2

Other objects of the invention will in part be obvious and will in part appear hereinafter. For a better understanding of the nature and objects of the invention, reference should be had to the following detailed description and drawing, in which the single figure is a schematic showing in elevation partly in section of the process of the present invention.

We have discovered that fibrous sheet materials treated with a thermosetting phenol-aldehyde resin varnish may be treated with steam in order to expedite the conversion of the resin to the intermediate or B stage with improvement in the physical properties of the ultimate laminate produced therefrom. Furthermore, the addition of accelerating agents to the phenol-aldehyde varnish may be effected in combination with the steam treatment to reduce greatly the time required to treat the sheet material and to cure the treated sheet material to the infusible stage.

Referring to the figure of the drawing, there is illustrated schematically apparatus for carrying out the steam treatment. The sheet fibrous material 10 which may be cloth, paper, or the like, passing over a guide roll 12 is led downwardly under a guide roll 14 disposed within a varnish impregnating tank 16, whereby the fibrous sheet material is coated with the phenolic varnish 18. The phenolic varnish 18 is composed of phenolaldehyde resin in the low polymeric or A stage dissolved in an easily volatilized organic solvent, preferably having a boiling point of from 40° C. to 160° C. The coated sheet 10 then passes between two squeeze rolls 20, 22 which are so adjusted as to permit only a predetermined weight of phenolic varnish to remain on the sheet 10. The sheet 10 coated with the phenolic varnish then passes between a plurality of steam pipes 24 and 26 disposed at either side of the sheet. The steam pipes 24 and 26 are provided with apertures or nozzles for directing jets of steam 28 against the entire varnish coating. It has been found that steam at moderate pressures of 1 or 2 pounds per square inch is satisfactory for the purpose of the invention. If the steam is of much higher pressure, it may be desirable to space the pipes at some distance away from the varnish impregnated sheet 10, so that the blast or force of the steam is attenuated. In any event, the steam should not be applied with such force as to drive off the varnish or adversely affect the sheet material itself. The temperature of the steam may be in the range of from 180° F. to 230° F. or even higher. Only a small amount of steam is required to confer substantial benefits, an amount of steam equal to about 1% of the weight of the varnish is adequate though larger amounts of up to 10% give desirable results. The amount of steam should not be such as to condense into many large visible drops of moisture.

The effect of the steam has been found to be quite beneficial in several respects. The viscosity of the varnish is reduced due to the increase in temperature imparted by the hot steam, and, accordingly, the penetration of the varnish into the fibrous sheet material is materially increased. Therefore, the sheet material is more thoroughly impregnated by the resin varnish. In addition, the steam introduces a proportion of water vapor into the varnish, and this assists in removing odoriferous or volatile constituents in the phenolic varnish, being in the nature of a steam distillation. The increased temperature of the phenolic varnish present on the sheet material hastens the conversion of the A stage resin to the intermediate or B stage. The solvent also tends to evaporate more readily. An unexpected advantage of the steam has been found in the treatment of cellulosic materials, such as paper or cotton cloth. The steam appears to be more readily absorbed by the cellulosic fibers than are most organic solvents and the wetting of the cellulosic fibers by the steam improves the penetration of the varnish, into the fibers, particularly where the solvent is one which is hydrophilic.

After passing the steam jets, the steamed varnish coated sheet material 10 is guided over rolls 30 into the drying oven 32 provided with suitable heating means such as an electrical resistance element 34. In the oven 32, the coated sheet material is rapidly heated to an elevated temperature sufficient to volatilize or remove the organic solvent present in the varnish as well as any water. Suitable means, such as a ventilating fan, not shown, may be employed to remove the vapors. The conversion of the phenolaldehyde resin to the B stage is also accomplished in the oven. The time and temperature to attain these ends has been found to be capable of considerable reduction by the previous application of steam. Furthermore, the temperature of the oven 32 may be increased considerably over the temperature that could be applied with satisfactory results to fibrous sheet material not previously steam treated. The speed of the treated material through the oven can be accordingly increased. An increase of from 25% to 50% in speed of the material has been secured. The dried, resin coated sheet material emerging from the oven 32 passes over guide rolls 36, 38 and may be wound into a roll 40 for storage or immediate use in preparing molded products therefrom.

We have further found that the utmost benefits from the steam treatment of varnish impregnated sheet material is obtained by incorporating certain basic accelerating agents within the phenol-aldehyde varnish 18. Specifically, it has been found that the addition of a primary aliphatic organic amine having a methylene group ($CH_2=$) attached to nitrogen, and having a boiling point of above 50° C. in an amount of from 0.1% to 2% of the weight of the resin in the varnish enables a considerable increase in the speed with which the fibrous material may be processed in the apparatus shown in the drawing. Primary diamines in particular have been found highly effective. Examples of suitable amines are ethylene diamine, 1,2-propylene diamine, 1,3-propylene diamine, diethylene diamine, hexamethylene diamine, ethanolamine, mono n-butyl amine, mono n-propylamine, benzylamine and mono amylamine. Primary amines directly attached to the ring structure in aryl groups have been found to be of no significant merit and in fact in most cases are retarders and inhibitors. It will be understood that aliphatic amines are those in which the amino nitrogen is not directly attached to an aryl group.

It has also been found that an increase in speed of treatment of sheet material with phenolaldehyde varnishes may be secured by incorporating as an accelerating agent from 0.1% to 2% by weight of the resin of a basic compound as selected from the group consisting of the alkali metal and alkaline earth metal oxides, carbonates, bicarbonates, and hydroxides. Examples of suitable basic compounds are sodium hydroxide, potassium hydroxide, sodium carbonate, potassium carbonate, barium hydroxide, calcium hydroxide, barium carbonate, calcium carbonate and sodium bicarbonate. The alkali metal and alkaline earth metal basic compounds of this class not only enable more rapid gelation of the phenolic varnish but they have been found to be of great value in enabling an increased speed of molding of the treated sheet material to the infusible stage.

The combination or both an organic amine and an alkali metal or alkaline earth metal basic compound in a phenolic varnish in combination with steam has enabled the preparation of both treated sheet material and the molding of the material so prepared at a much faster rate than has been thought possible heretofore. In addition the products produced have been unexpectedly improved, both in their dimensional stability and resistance to moisture.

The following is indicative of the improvement secured with the present invention. A resin was prepared by reacting the following:

*Table I*

| | |
|---|---|
| Phenol (hydroxy benzene) mole | 1.0 |
| Formaldehyde (38% aqueous solution) moles | 1.25 |
| Ethylene diamine (70% aqueous solution) percent of weight of phenol | 0.5 |

The phenol, formaldehyde and the amine catalyst were placed in a reaction vessel equipped with a heater and a reflux column. The reactants were heated at a temperature of from 90° C. to 100° C. and allowed to reflux for a period of time of from 90 minutes to 135 minutes, with a reflux time of 120 minutes appearing to give the optimum results. At the end of the refluxing period, the reaction vessel was connected to a vacuum pump and the absolute pressure was rapidly reduced to about 0.2 atmosphere absolute pressure or less. The temperature of the resin dropped below 100° C. during the initial stage of distillation and rose slowly as evacuation proceeded. The vacuum may be increased to an absolute pressure of as low as 0.01 atmosphere. In one particular case involving the reactants of Table I distillation was initiated at an absolute pressure of 40 millimeters of mercury and continued until an absolute pressure of 20 millimeters of mercury at a temperature of 150° C. was attained. During evacuation any unreacted phenol, formaldehyde, water and other volatile ingredients, as well as low polymers, are removed. The resin is in the so-called A stage.

After distillation, an organic solvent was added to kill the reaction, and to dissolve the reaction product. A great variety of organic solvents may be employed. Ethanol, ethyl acetate, acetone, methyl-ethyl ketone, benzene, xylene, ethylene glycol and mixtures may be employed in producing a phenol-formaldehyde varnish for impregnating purposes. Solutions of any desirable resin content may be produced. A solution having from 40 per cent to 60 per cent by weight of resin solids forms a varnish with a viscosity suited for most impregnating applications.

The ethylene diamine employed in the preparation of the resin has been found to have disappeared substantially completely and will not be present in the varnish solution produced. Therefore, its use in reacting the initial ingredients in the reaction vessel is the sole benefit obtained therefrom. An organic amine must be added to the varnish if an accelerating catalyst for conversion to the B stage is required.

A varnish was prepared from an equal weight of the resin of Table I and an equal weight of ethanol. The varnish when applied to kraft paper and passed through a given tower at a predetermined temperature, found to be critical, required a speed of about 45 inches per minute to produce a satisfactory B stage resin sheet. The improvement secured by using steam alone and adding the accelerating catalysts in combination with steam are shown in the following table:

*Table II*

| Steam | Accelerating Catalyst | Oven Speed, in./min. | Per cent water absorbed after 24 hrs. immersion by ½ inch laminate | Per cent edge swelling after 24 hrs. immersion in water |
|---|---|---|---|---|
| No | None | 45 | 1.49 | 2.80 |
| Yes | None | 60 | 1.48 | 3.11 |
| Yes | 0.3% NaOH | 100 | 1.43 | 2.45 |
| Yes | 0.4% NaOH | 90 | 1.22 | 2.05 |
| Yes | 1% ethylene diamine | 66 | 1.08 | 0.87 |
| Yes | 1% ethylene diamine and 0.4% NaOH | 140 | 1.45 | 1.89 |

Approximately 30% increase in speed is obtained by using steam alone. It will be apparent that an ultimate increase in speed over 300% may be secured with accelerating agents. It should be noted that ethylene diamine gives the best moisture resistance with a substantial increase in speed. Various physical tests showed that excellent physical properties, such as tensile strength, are present in the final product made at the highest speeds.

Various other phenolic resins applied as a varnish to fibrous materials may be treated with steam in order to improve the processing time. The following are typical examples of phenolic resins that may be processed at greater speeds by applying steam in accordance with the invention:

*Table III*

Formaldehyde _____ moles__ 1.1
Phenol _____ mole__ 1
Ammonia catalyst_____ per cent__ 1

The above reactants were placed within an enclosed vessel and heated while being stirred to a temperature of 95° C. with refluxing. After 1½ hours refluxing time, the vessel was subjected to evacuation until a 24" vacuum was applied and the temperature of the reactants had reached 120° C. The resin in the vessel was dissolved in a mixture of equal parts of ethanol and benzene to produce a solution having 40% resin.

*Table IV*

Cresylic acid _____ mole__ 1
Formaldehyde _____ moles__ 0.8 to 1
Sodium carbonate _____ per cent__ ½

The ingredients were placed within a closed reaction vessel and stirred for ½ hours at 85° C. without refluxing. The reaction was terminated by adding a mixture of equal parts of ethonal and xylene to produce a varnish. This varnish may be applied to fibrous material and then treated with steam to secure an improved rate of drying in the oven.

Numerous other phenolic resins capable of thermosetting to an infusible state may be applied as varnishes to fibrous sheet materials and treated with steam to improve the product as well as decrease the time required to convert to the B stage. The benefits of steam application may be enhanced by incorporating the accelerating agents in the resin varnish.

Since certain changes may be made in the above invention and different embodiments of the invention may be made without departing from the scope thereof, it is intended that all matter contained in the above-described disclosure shall be interpreted as illustrative and not in a limiting sense.

We claim as our invention:

1. In the process for applying a partially reacted thermosetting phenol aldehyde resin in solution in a volatile organic solvent to fibrous material, the steps comprising admixing in the solution of the phenolic resin an accelerator comprising from 0.1% to 2% of the weight of the resin of a primary aliphatic organic amine having a methylene group attached to nitrogen, the organic amine having a boiling point above about 50° C., applying the solution of phenolic resin and organic amine to the fibrous material, directing jets of steam of a temperature of 180° F. and higher upon the undried fibrous material treated with the solution of phenolic resin and organic amine, the steam providing for increased penetration of the phenolic resin into the fibrous material and decreasing the gelation time without appreciably causing a conversion to the B-stage of the phenolic resin, terminating the application of steam, and subjecting the steam-treated fibrous material to heat to remove the solvent and to cause gelation of the phenolic resin to a condition short of the infusible state.

2. In the process for applying a partially reacted thermosetting phenol aldehyde resin in solution in a volatile organic solvent to fibrous material, the steps comprising admixing in the solution of the phenolic resin an accelerator comprising from 0.1% to 2% of the weight of the resin of an inorganic base selected from the group consisting of the alkali metal and alkaline earth metal oxides, hydroxides, bicarbonates and carbonates, and from 0.1% to 2% of the weight of the resin of a primary aliphatic organic amine having a methylene group attached to nitrogen, the organic amine having a boiling point above about 50° C., applying the solution of phenolic resin and accelerator to the fibrous material, directing jets of steam of a temperature of 180° F. and higher upon the undried fibrous material treated with the solution of phenolic resin and accelerator, the steam providing for increased penetration of the phenolic resin into the fibrous material and decreasing the gelation time of the phenolic resin, terminating the application of steam before an appreciable conversion of the phenolic resin to the B-stage, and subjecting the steam-treated fibrous material to heat to remove the solvent and to cause gelation of the phenolic resin to a condition short of the infusible state.

3. In the method of treating a fibrous material with a potentially thermosetting phenolic resin in solution in a volatile organic solvent, the steps comprising applying the phenolic resin in solution to the fibrous material, directing jets of steam of a temperature of 180° F. and higher upon the resin treated undried fibrous material, terminating the application of steam before an appreciable conversion of the phenolic resin to the B-stage, and further heat-treating the fibrous material to remove the solvent and to cause gelation of the phenolic resin to a condition short of the infusible state.

4. In the method of treating cellulosic sheet material with a potentially reactive phenol-aldehyde resin in solution in a volatile organic solvent, the steps comprising applying the solution of phenol-aldehyde resin to the cellulosic sheet material, subjecting the undried treated sheet material to jets of steam of a temperature of 180° F. to 230° F. and higher whereby the cellulosic material absorbs the phenol-aldehyde resin more readily, terminating the application of steam before an appreciable conversion of the phenolic resin to the B-stage, and further heat treating the cellulosic sheet and applied phenol-aldehyde resin solution to remove the volatile solvent and convert the phenolic resin to the B-stage.

5. In the method of treating a fibrous material with a potentially reactive thermosettable phenolic resin dissolved in a volatile organic solvent, the steps comprising applying the solution of phenolic resin to the fibrous material, blowing steam of a temperature of at least 180° F. upon the undried fibrous material with the applied phenolic resin solution thereon, the steam being applied in an amount equal to from about 1% to 10% of the weight of the phenolic resin solution, the applied steam not appreciably converting the phenolic resin to the B-stage, then separately heating the steam-treated fibrous material to drive off the solvent and moisture and to cause gelation of the phenolic resin to a condition short of the infusible state.

JOSEPH J. WACHTER.
CYRIL J. STRAKA.

REFERENCES CITED

The following references are of record in the file of this patent:

UNITED STATES PATENTS

| Number | Name | Date |
|---|---|---|
| 738,347 | Myers | Sept. 8, 1903 |
| 954,666 | Baekeland | Apr. 12, 1910 |
| 1,284,432 | O'Conor | Nov. 12, 1918 |
| 1,352,436 | Dickey | Sept. 14, 1920 |
| 1,458,543 | Pollak | June 12, 1923 |
| 1,987,694 | Mains | Jan. 15, 1935 |
| 2,088,227 | Battye et al. | July 27, 1937 |
| 2,093,651 | Widmer | Sept. 21, 1937 |
| 2,190,672 | Meharg | Feb. 20, 1940 |
| 2,452,005 | Weltman | Oct. 19, 1948 |